Figure 1:
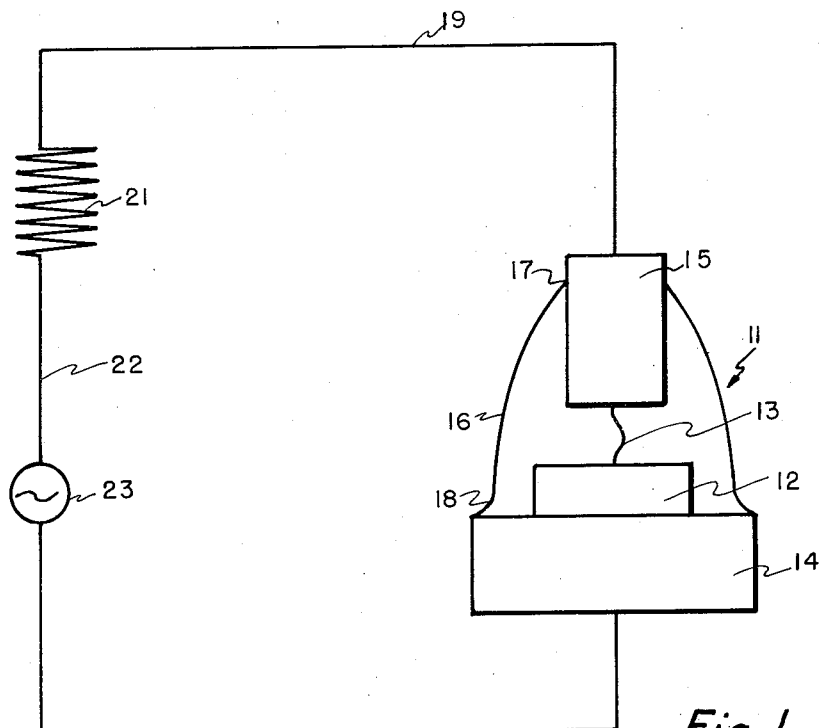

Feb. 20, 1962

F. V. WILLIAMS ET AL 3,022,452

DIODE

Filed Oct. 16, 1959

INVENTORS
FORREST V. WILLIAMS
ROBERT A. RUEHRWEIN
BY   DALE E. HILL

*Lloyd B. Stevens, Jr.*
ATTORNEY

# United States Patent Office 3,022,452
Patented Feb. 20, 1962

3,022,452
DIODE
Forrest V. Williams, Robert A. Ruehrwein, and Dale E. Hill, Dayton, Ohio, assignors to Monsanto Chemical Company, St. Louis, Mo., a corporation of Delaware
Filed Oct. 16, 1959, Ser. No. 846,850
11 Claims. (Cl. 317—236)

The invention relates to a diode or point contact rectifier usable at high temperatures having a boron phosphide semi-conductor body or element as a part thereof.

It is a primary object of this invention to provide a point contact rectifier that will operate at high temperatures, i.e., temperatures up to about 1000° C.

This and other objects of the invention will become apparent as the detailed description of the invention proceeds.

Crystalline boron phosphide has been found to be especially suitable for high temperature use. It has been found by optical measurements on cubic crystalline boron phosphide that it has a forbidden energy gap of about 5.8 electron volts. This compares with silicon having a forbidden energy gap of about 1.1 electron volt and germanium having a forbidden energy gap of about 0.7 electron volt. Germanium can only be used as a rectifier to temperatures up to about 80° C. Silicon can be used at higher temperatures than germanium; but cannot be used at temperatures even approaching that at which boron phosphide can be used, i.e. up to about 1000° C. Crystalline boron phosphide, of course, exhibits the usual negative temperature coefficient of resistance of a semiconductor. Doping agents from either groups IIB or VIB of Mendelyeev's Periodic Table, magnesium and beryllium can be used to change the type or degree of conductivity of crystalline boron phosphide.

A number of different processes for producing crystalline cubic boron phosphide are known as illustrated by copending applications which are described hereinbelow.

Copending application S.N. 718,463, filed March 3, 1958, and now Patent No. 2,966,426, describes a process for producing crystalline boron phosphide which involves contacting a boron halide, hydride or alkyl with a phosphorus halide or hydride at a temperature of at least 1100° F. If it is desired, during the process of producing the boron phosphide, a volatile chloride of a group IIB element or magnesium or beryllium can be added in trace amounts to the reactants in minor amounts to give a P-type boron phosphide crystalline material. If an N-type material is desired a group VIB element can be added during the process in trace amounts to give an N-type crystalline boron phosphide. Actually during the process of making the crystalline boron phosphide, whether doping agents are added or not, sufficient impurities will normally be picked up by the boron phosphide being formed to make it either N- or P-type. Doping of the boron phosphide, of course, can be done after the formation of the crystalline boron phosphide by diffusion of the doping agents into the crystalline structure at elevated temperatures, but normally it is preferred to do the doping during the manufacture of the boron phosphide.

Another copending application S.N. 718,464, filed March 3, 1958, and now Patent No. 2,974,064, describes a process of producing crystalline boron phosphide by contacting a gaseous boron compound with elemental phosphorus and hydrogen at a temperature of at least 1100° F. Doping during the manufacture of the boron phosphide is conducted, if desired, in a manner similar to that described for the process of application Serial No. 718,463 hereinabove.

In application S.N. 718,465, filed March 3, 1958, is described a process of producing crystalline boron phosphide by heating a metal phosphide and a metal boride in an inorganic matrix. In this process doping to form N-type material can be accomplished by adding oxygen or sulfur, preferably an oxide or a sulfide in small amounts to the inorganic matrix. Actually, the preferred elements in all the processes for doping to obtain N-type conductivity are selenium and tellurium, and in this process selenium and tellurium can be added directly to the melt. Polonium, an N-type doping agent, of course, normally will be a less desirable and much more expensive doping agent, but if it were desirable to use this element it too can be added as an element to the melt from which the boron phosphide crystals are produced. To obtain P-type boron phosphide crystals by doping, beryllium, magnesium, zinc, cadmium or mercury metals can be added to the melt of this process, preferably zinc or cadmium or magnesium or beryllium.

Copending application S.N. 823,329, filed June 29, 1959, described a process for producing cubic crystalline boron phosphide of N-type conductivity involving contacting a gaseous stream of boron suboxide with a gaseous stream of elemental phosphorus at a temperature in the range of about 1000° C. to 1800° C. and precipitating boron phosphide from the gas phase. Doping to change the degree or type of conductivity, if desired, is carried out in this method in a manner similar to that described for application S.N. 718,463 hereinabove.

Application S.N. 823,360, filed June 29, 1959, describes a process of producing single crystals of boron phosphide. In this process a crude source of boron phosphide is contacted with a hydrogen halide vapor at a temperature in the range of from 600 to 1500° C. and the resulting gaseous mixture is subjected to a higher temperature in the range of from 800 to 1800° C. using a temperature increase from the first zone of contacting to the second zone of contacting from 50° C. to 1000° C. with the resultant production of a single crystal of boron phosphide in the second zone. Doping, if desired, a vary the degree or type of conductivity can be carried out in a manner similar to that described hereinabove for application S.N. 718,463.

Doping boron phosphide after the formation of the boron phosphide crystal, a method not normally quite so desirable as doping during the manufacture of the crystal, can be carried out as follows: The boron phosphide is heated up to a temperature of about 800° C. and subjected to a minor amount of the vaporized doping element which is allowed to diffuse into the boron phosphide crystal. Normally long periods of time will be required for this type of doping procedure, possibly several days or more. When it is decided that sufficient doping agent has diffused throughout the crystal of boron phosphide, the crystal is rapidly quenched reducing the temperature to room temperature. This, of course, is the conventional diffusion and quench method used for doping semi-conductor materials after the crystalline material has been made. If the material is cooled slowly, rather than being quenched, of course the doping agent will diffuse right out of the crystal lattice again. Quenching traps the doping agent within the crystal lattice.

In an experiment to test the rectifying properties of boron phosphide as a diode or point-contact rectifier a single crystal of boron phosphide (dimensions~1 mm. x 1 mm. x ½ mm.) with one contact made using silver paint and the second contact made with a pointed tungsten wire showed a resistance ratio in one direction versus that in the reverse direction of 1000/1 in tests conducted at a temperature of 20° C. This experiment illustrates the excellent point-contact rectifying properties of boron phosphide.

Broadly speaking the point contact rectifier of the invention usable at high temperatures comprises a boron phosphide semiconductor body, a high melting point conductor attached to the semiconductor body forming an ohmic junction thereon, and a point contact electrode attached to the semiconductor body. The point contact electrode to be usable at high temperatures should, of course, have a high melting point as most, if not all, of the point contact electrodes currently used have.

Figure 2:
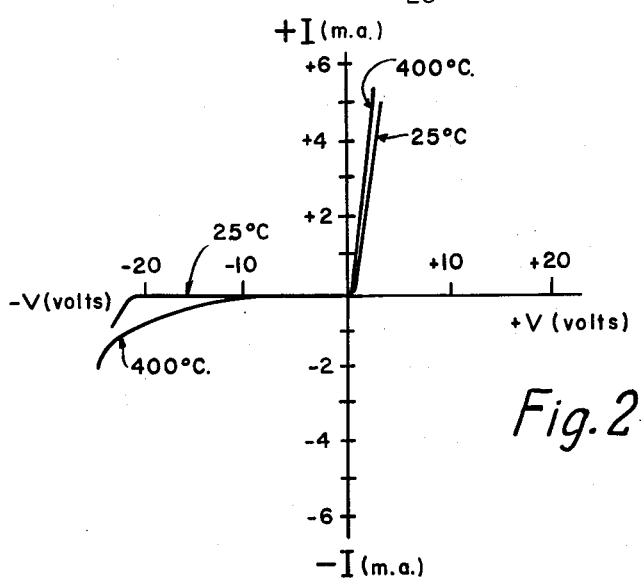

The invention will be more clearly understood from the following detailed description of a specific example thereof, read in conjunction with the accompanying drawing wherein:

FIGURE 1 is a schematic drawing of an embodiment of the invention with accompanying circuitry; and FIGURE 2 is a graph of the rectification characteristics of a P-type boron phosphide single crystal at low and high temperatures.

In FIGURE 1 is shown a point contact rectifier or diode 11 designed for high temperature operation with accompanying circuitry. A single crystal of cubic boron phosphide having N-type conductivity constitutes semiconductor body 12 of the rectifier. Suitably semiconductor body 12 is in the form of a thin disc or wafer of boron phosphide. To form the rectifying contact on the semiconductor body, a tungsten or Phosphor-bronze whisker 13 is used. One end of whisker 13 is pressed against the upper surface of wafer 12 to make a rectifying contact with the wafer of boron phosphide. Suitably a pressure of about 50 grams of force is used in pressing the point contact electrode 13 against the top of disc 12; however, this force might vary from about 10 to about 100 grams more or less, for optimum performance. Sometimes whisker or point contact electrode 13 is welded to semiconductor body 12 by passing a heavy surge current through the rectifier. The upper end of whisker 13 is soldered or welded to electrode 15 which is suitably copper or nickel, or alternatively the whisker can be held in contact with electrode 15 by other mechanical means. An ohmic junction is made to the bottom side of disc 12 by fusing nickel electrode 14 having about 10% by weight based on the nickel of tellurium or selenium therein. This fusion is accomplished by pressing disc 12 against electrode 14 at a temperature of about 1100° C. and allowing sufficient time for the selenium and tellurium in the nickel to diffuse into the surface of disc 12 thereby welding disc 12 to conductor 14. Surrounding and enclosing disc 12 and point contact electrode 13 is glass capsule 16. Glass to metal seals 17 and 18 seal capsule 16 to electrodes 14 and 15. Such an arrangement as this allows the maintenance of any desired atmosphere around disc 12, including high vacuum, if desired. If the rectifier 11 including electrical leads 19 and 20 is not to be encapsulated and would be subjected to an oxidizing atmosphere at high temperature, it is preferred to use nickel leads 19 and 20, which are suitably soldered or welded to conductors 14 and 15. If rectifier 11 or at least leads 19 and 20 are not to be subjected to an oxidizing atmosphere, copper leads are satisfactory. Suitably leads 19 and 20 can be attached to conductors 14 and 15 by welding or by other mechanical means. Alternating current source 23 is applied to rectifier 11 through resistor 21 via leads 19, 20 and 22, and the rectified voltage appears across resistor 21.

Alternatively, ohmic contact can be made with wafer 12 by fusing a platinum contact to the lower surface of wafer 12. Electrode 14 in this case can be a pure nickel or copper electrode having no selenium or tellurium therein. In fusing the platinum contact to the wafer a sufficiently high temperature, preferably not more than about 800° C. is used. Using the platinum to make ohmic contact with wafer 12 forms a junction which will not withstand as high temperatures as that of the ohmic junction previously described made with nickel containing selenium or tellurium. Ohmic contact can be made to the bottom surface of wafer 12 by using silver paint to join wafer 12 and electrode 14; however, such an ohmic junction breaks down at relatively low temperatures of the order of about 300° C.

It is indicated hereinabove that nickel having about 10% by weight based on the nickel of selenium or tellurium therein is useful in making ohmic contact with an N-type boron phosphide crystal. If a P-type boron phosphide crystal were used, nickel containing about 10% zinc or cadmium would be used to make the ohmic contact. Actually, in addition to zinc and cadmium, beryllium, magnesium and mercury of the group IIB elements can be used instead of zinc or cadmium, although magnesium, beryllium zinc or cadmium or mixtures thereof are preferred. Instead of selenium or tellurium in the nickel for making ohmic junction with an N-type wafer of boron phosphide, oxygen, sulfur, or polonium can be used; however, selenium or tellurium or mixtures thereof are preferred. Normally, it will be preferred to use not more than about 15%, preferably not more than about 10% by weight, of the group IIB and group VIB elements of Mendelyeev's Periodic Table, magnesium and beryllium in the nickel based on the nickel; however, larger amounts can be used, but in any event the mixture of nickel and these other elements should consist primarily of nickel on a weight basis, i.e., nickel having minor amounts of these elements therein. Other conductors than nickel having high melting points can be used in place of nickel conductors 14 and 15, e.g. iron, silver, gold, copper, etc. The group IIB or group VIB elements of Mendelyeev's Periodic Table, magnesium and beryllium which are used as doping agents would be incorporated in these metals in the same proportion as they were in nickel for the device of FIGURE 1. These other conducting metals would then replace nickel conductors 14 and 15 of FIGURE 1.

In experiments carried out at 25° C. and 400° C., the point-contact rectification characteristics of a single crystal of P-type boron phosphide were compared. The dimensions of the crystal were approximately 1 x 1 x ½ mm. ohmic contact was made to one side of the crystal using silver paint. The silver painted side of the crystal was then placed on the copper tip of a soldering iron. The point-contact electrode was a pointed tungsten wire or whisker which was pressed against the upper uncoated side of the boron phosphide crystal. Electrical connections were made to the soldering iron and to the tungsten wire. A 60 cycle alternating current which could be varied in voltage and a resistor were connected in series with the boron phosphide crystal via the electrical connections. Measurements were made of the current in milliamperes flowing through the rectifier and the voltage across the rectifier at 25° C. (room temperature) and 400° C. The soldering iron was heated to achieve the 400° C. testing temperature for the crystal. The data from these experiments plotted in FIGURE 2 indicate that boron phosphide crystals are suitable for use in point-contact rectifiers at high temperatures as well as at ordinary temperatures.

Although the invention has been described in terms of specified apparatus which is set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A high temperature point-contact rectifier comprising a semiconductor body of boron phosphide, a high melting point conductor attached to said semiconductor body forming an ohmic junction thereon, and a point contact electrode attached to said body.

2. The rectifier of claim 1, wherein said conductor is platinum which has been fused to said semiconductor body.

3. The rectifier of claim 1, wherein said conductor contains minor amounts of an element selected from groups II B and VI B of Mendelyeer's Periodic Table, magnesium or beryllium, said conductor being fused to said semiconductor body.

4. The rectifier of claim 3, wherein said semiconductor body is N-type and said conductor is nickel having a minor amount of an element selected from the class consisting of selenium and tellurium.

5. The rectifier of claim 3, wherein said semiconductor body is P-type and said conductor is nickel having a minor amount of an element selected from the class consisting of magnesium, beryllium, cadmium and zinc.

6. A high temperature point-contact rectifier comprising an N-type boron phosphide semiconductor wafer, a first nickel conductor having therein not more than about 15% by weight based on the nickel of an element selected from the class consisting of selenium and tellurium fused to one side of said wafer forming an ohmic junction therewith, a point contact electrode selected from the class consisting of tungsten and Phosphor-bronze attached to the other side of said wafer, the other end of said point contact electrode being attached to a second nickel conductor, a glass capsule enclosing said disc and said point-contact electrode, said capsule being joined to said first and second conductors by metal glass-metal seals.

7. The rectifier of claim 6, wherein nickel electrical leads are attached to said nickel conductors.

8. The rectifier of claim 6, wherein copper electrical leads are attached to said nickel conductors.

9. A high temperature point-contact rectifier comprising a P-type boron phosphide semiconductor wafer, a first nickel conductor having therein not more than about 15% by weight based on the nickel of an element selected from the class consisting of magnesium, beryllium, cadmium and zinc fused to one side of said wafer forming an ohmic junction therewith, a point-contact electrode selected from the class consisting of tungsten and Phosphor-bronze attached to the other side of said wafer, the other end of said point-contact electrode being attached to a second nickel conductor, a glass capsule enclosing said disc and said point contact electrode, said capsule being joined to said first and second conductors by metal glass-metal seals.

10. The rectifier of claim 9, wherein nickel leads are attached to said nickel conductors.

11. The rectifier of claim 9, wherein copper leads are attached to said nickel conductors.

References Cited in the file of this patent

FOREIGN PATENTS 719,873    Great Britain _____ Dec. 8, 1954